United States Patent
DeMott et al.

[11] Patent Number: 5,902,753
[45] Date of Patent: May 11, 1999

[54] BARRIER FABRIC COMPOSITE AND ITS METHOD OF PREPARATION

[75] Inventors: Roy P. DeMott; William C. Kimbrell, Jr., both of Spartanburg; Allan W. Smith, Gaffney, all of S.C.

[73] Assignee: Milliken & Company, Spartanburg, S.C.

[21] Appl. No.: 08/872,956

[22] Filed: Jun. 11, 1997

[51] Int. Cl.$^6$ .............................. B32B 27/12; B32B 27/04
[52] U.S. Cl. ................................ 442/79; 442/59; 442/64; 442/71; 442/85; 442/131
[58] Field of Search ................. 442/79, 59, 64, 442/71, 85, 131

[56] References Cited

U.S. PATENT DOCUMENTS

| | | | |
|---|---|---|---|
| 2,227,212 | 12/1940 | Beck | 154/2 |
| 3,244,571 | 4/1966 | Weisman | 147/23 |
| 3,527,654 | 9/1970 | Jones et al. | 117/66 |
| 4,525,409 | 6/1985 | Elesh | 428/193 |
| 4,563,229 | 1/1986 | Sorez | 156/64 |
| 4,692,199 | 9/1987 | Kozlowski et al. | 156/245 |
| 4,861,409 | 8/1989 | Hashida et al. | 156/308.2 |
| 4,919,998 | 4/1990 | Goad et al. | 428/265 |
| 4,973,510 | 11/1990 | Tanaka | 428/212 |
| 5,000,805 | 3/1991 | Lowe | 156/90 |
| 5,045,375 | 9/1991 | Davis et al. | 428/96 |
| 5,565,265 | 10/1996 | Rubin et al. | 428/265 |

FOREIGN PATENT DOCUMENTS

| | | | |
|---|---|---|---|
| 0 397 331 | 4/1990 | European Pat. Off. | B32B 31/28 |
| 1101549 | 8/1966 | United Kingdom | B32B 5/08 |

*Primary Examiner*—Jenna Davis
*Assistant Examiner*—Jason Savage
*Attorney, Agent, or Firm*—Terry T. Moyer; William S. Parks

[57] ABSTRACT

A barrier fabric composite is provided which comprises:

i) a textile fabric comprising a front surface, a back surface, interstices within said fabric, and a determinable interstitial volume;

ii) a liquid barrier enhancing thermoplastic within said interstices and on said back surface, filling at least 50% of said interstitial volume; and iii) a liquid barrier enhancing plastic coating, on the back surface of said thermoplastic, having a higher melting point or glass transition temperature ($T_g$) than said thermoplastic, and capable of withstanding temperatures of at least 350° F.

The composite can be prepared by a) forming a film and fabric composite having a determinable interstitial volume by simultaneously feeding a thermoplastic film and a textile fabric between first and second rollers, wherein said film is heated to a plastic state and forced into interstices in the backside of said fabric by said first roller so as to fill at least 50% of the interstitial volume;

b) applying to the backside of the composite resulting from step a) a liquid barrier enhancing plastic coating having a higher melting point or glass transition temperature ($T_g$) than said thermoplastic, and capable of withstanding temperatures of at least 350° F; and c) drying said liquid barrier enhancing plastic coating.

8 Claims, 1 Drawing Sheet

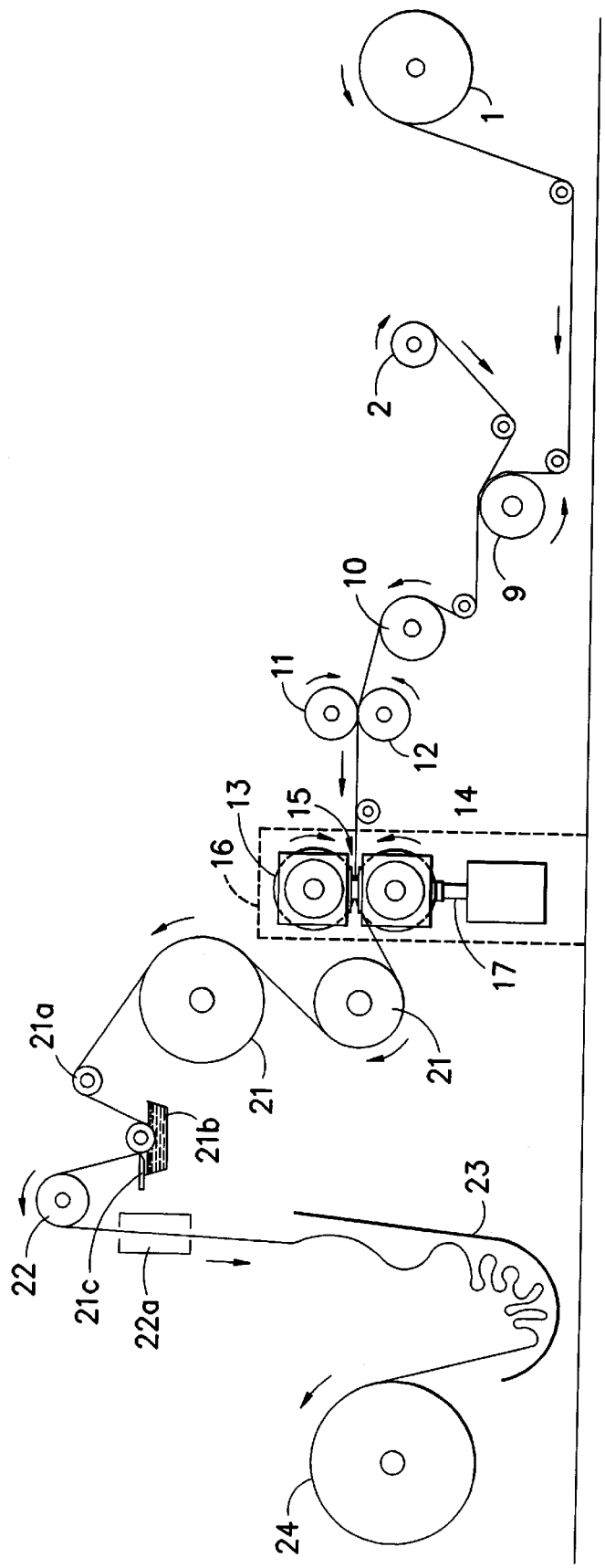
FIG. -1-

BARRIER FABRIC COMPOSITE AND ITS METHOD OF PREPARATION

FIELD OF THE INVENTION

A barrier fabric composite is provided which can be used in applications for liquid barrier fabrics. More particularly, a fabric composite is provided which contains a thermoplastic placed within the fabric interstices from the fabric backside and a heatresistant coating applied over the thermoplastic on the backside of the fabric, such that the resulting composite can withstand transfer printing conditions. The resulting material is especially suited to use for stain-resistant fabrics for institutional or commercial settings such as hospitals, nursing homes, and restaurants.

BACKGROUND OF THE INVENTION

Various processes are known to make fabrics liquid resistant. Such processes include treatment by soaps, silicones, or polymers such as vinyl, urethane and various latex coatings. U.S. Pat. No. 5,565,265 to Rubin et al. discloses a polyester fabric which is coated with a composition comprising a nonfluorinated copolymer composition such as acrylic copolymer, an antimicrobial composition and a fluorochemical composition. Although the coated fabric can be transfer printed, the resulting product lacks the hand of a fine fabric and high breathability as measured by air permeability test ASTM D737, perhaps due to a combination of fiber to fiber bonding resulting from copolymer latex padded onto the substrate and penetration of the acrylic backcoating into the interstices between the yarns comprising the fabric.

Fabrics for blocking out light have been produced by a three-pass backcoating process. A white (titanium dioxide-containing) latex is applied onto a fabric substrate, a light absorbing black (carbon black-containing) latex is applied onto the white late, and a second coat of white latex is applied onto the black latex. The white latex coats are applied to prevent the black latex coat from being visible on either side of the fabric. While providing an effective "blockout" fabric, the process requires three passes of backcoating and results in adverse drapability (the desired pleating effect and the way in which the. drape hangs) owing to the thickness of the backcoating layers. Parent application U.S. patent Application Ser. No. 071829,521, filed Jan. 31, 1992 discloses a composite suitable f or use in the manufacture of interior automotive parts, which comprises a surface layer of a textile fabric weighing from 6 ounces per square yard to 24 ounces per square yard said fabric being comprised of fibers made at least predominately (that is containing at least 80 percent) from a synthetic thermoplastic polymer selected from nylon or polyester; and a layer of a thermoplastic film, e.g., polyester/polyurethane having a thickness of from 0.5 mil to 20 mils, said film having b een heat bonded to the textile fabric. The resulting composite is not transfer printable, but retains good "hand" or texture characteristics of its fabric component.

It would be desirable to provide a fabric composite suited for use in institutional environments, which provides the good liquid barrier, cleanability, stretchability and characteristics of a plastic or vinyl material, while further providing cloth-like hand, drape, and printability characteristics. It would also be desirable to provide a "blockout" fabric composite which is economical to produce and which has improved drapability.

SUMMARY OF THE INVENTION

The present invention relates to a barrier fabric composite comprising:

i) a textile fabric comprising a front surface, a back surface, interstices within said fabric, and a determinable interstitial volume;

ii) a liquid barrier enhancing thermoplastic within said interstices and on said back surface, said thermoplastic filling at least 50%, preferably at least 90%, of the interstitial volume; and iii) a liquid barrier enhancing plastic coating of higher melting point or glass transition temperature ($T_g$) than said thermoplastic, applied on the back surface of said thermoplastic film, said coating being capable of withstanding temperatures of at least 350° F.

In another aspect, the present invention relates to a barrier fabric composite comprising:

i) a polyester textile fabric comprising a front surface, a back surface, interstices within said fabric, and a determinable interstitial volume;

ii) a liquid barrier enhancing thermoplastic polyester/polyurethane within said interstices and on said back surface, and filling at least 50% of the interstitial volume; and iii) a liquid barrier enhancing polyurethane-containing plastic coating on the back surface of said thermoplastic, said coating having a higher melting point or glass transition temperature ($T_g$) than said thermoplastic, and said coating being capable of withstand ing temperatures of at least 350° F.

In still another aspect, the present invention relates to a method of preparing a barrier fabric composite which comprises a) forming a film an d fabric composite by simultaneously feeding a thermoplastic film having a thickness of from 0.2 to 20 mils, and a textile fabric having a determinable interstitial volume, between first a nd second rollers , wherein o ne side of said film is in contact with a backside of said fabric and an opposite side of said film is in contact with said first roller and said first roller is heated to a temperature above the melting point of said film, a face side of said fabric is in contact with said second roller, and a distance between said first and second rollers is less than the combined thickness of said film and 0.50 times the thickness of said fabric, and further wherein said film is heated to a plastic state and forced into interstices in the backside of said fabric by said first roller such that at least 50% of said interstitial volume is filled by said thermoplastic film;

b) applying to the backside of the composite resulting from step a) a liquid barrier enhancing plastic coating of higher melting point or glass transition temperature ($T_g$) than said thermoplastic film, preferably such that at least 95% of said interstitial volume is filled, said coating being capable of withstanding temperatures of at least 350° F; and c) drying said liquid barrier enhancing plastic coating.

Additional objects, advantages, and features of the present invention will become apparent from the following description and appended claims.

DESCRIPTION OF THE DRAWING

The FIGURE is a side view of the preferred process to prepare the fabric composite of the present invention.

DETAILED DESCRIPTION OF THE PREFERRED EMBODIMENTS

A liquid resistant fabric composite which can be transfer printed is provided. The composite may also be treated to be stain-resistant and antimicrobial. The fabric composite of the present invention retains the texture of its fabric component and is thus attractive to both eye and touch. The fabric composite of the present invention is also durable, easy to handle, and economical to produce.. The composite is especially useful in that it can have better liquid barrier properties as measured by various tests, e.g., Hydrostatic Pressure Test (AATCC Test Method 127-1980), than commercially available products. Indeed, hydrostatic pressures of at least 100 cm, 120 cm, 140 cm or even higher can be withstood by the unique composite of the present invention, in some instances with a single liquid barrier enhancing plastic coating.

FABRIC COMPONENT

In the method of the present invention, the textile fabric component of the composite can be any suitable fabric, especially a fabric selected from the group consisting of polyester, polyolefin, and nylon, with polyester or polyester-nylon blend being preferred. According to the present invention, a fabric composite is provided which is especially suitable for use as upholstery fabric or draperies. The composite comprises a surface layer of a textile fabric weighing from 6 ounces per square yard to 24 ounces per square yard, said fabric being comprised of fibers made at least predomiately, i.e., containing at least 80 percent, from a synthetic thermoplastic polymer selected from polyester, polyolefin, or nylon; and a layer of a thermoplastic film having a thickness of from 0.5 mil to 20 mils, said film having been heat bonded to said textile fabric.

As mentioned above, the fabric components of the present invention include a wide variety of fabrics made predominately from polyester fibers, polyolefin fibers, or nylon fibers. Such fabrics may include wovens such as flat wovens, napped wovens, woven stretch velours, woven stretch fabrics containing some Lycra®; knits such as Raschel knits, and napped Raschel knits; double needle bar fabrics; weft insertion fabrics; and double knits. Even non-woven fabrics may be envisioned for use in connection with the present invention, such as fabrics currently employed as automotive interior face fabrics, e.g., non-woven needle punch fabrics. The fabrics, broadly speaking, may weigh from about 3 to about 24 ounces per square yard, preferably from about 5 to about 20 ounces per square yard. The fabrics typically range in thickness from 20 to 100 mils, preferably from 40 to 90 mils. The flat, woven fabrics tend toward the lower end of the thickness range, whereas the piles, especially cut piles such as velours, are generally at the higher range of thickness.

Before further treatment, the fabric can be scoured to remove oils, size, and other impurities, and then optionally dried.

FLUROCHEMICAL/ANTIMICROBIAL TREATMENT OF FABRIC

The fabrics can be treated, preferably prior to compositing of the fabric with thermoplastic component, with fluorochemicals to impart water and stain resistance and stain removability, as well as with antimicrobial agents. The entire fabric can be treated, e.g., by immersing within a bath containing such materials; alternatively, one or both sides may be treated, e.g., by spraying.

The fluorochemical compositions provide water and stain resistance and may comprise unbranded generic fluoropolymers. Commercially available fluorochemical compositions such as SCOTCHGUARD® FC 255, SCOTCHGUARD® FC 214-230, available from 3M, Minneapolis, Minn., and TEFLON® RN, TEFLON® 8070, TEFLON® 8787, available from Dupont of Wilmington, Del., and Milliguard® BK 96, available from Milliken Chemical Co. of Spartanburg, S.C., are preferred. The fluorochemicals are added in effective amounts, e.g., amounts ranging from 0.5 to 10%, preferably 1 to 5%, based on fabric weight.

The antimicrobial agent is a substance or combination of substances that kills or prevents the growth of a microorganism, and includes antibacterial, antiffmgal, antiviral and antialgal agents. A suitable antimicrobial agent is a combination of ULTRAFRESH™NM (0.5 to 5%, preferably about 1.5%, based on fabric weight), and ULTRAFRESH ™40 (0.1 to 1.5%, preferably about 0.5% by fabric weight), available from Thomson Research of Toronto, Canada. Other such agents include INTERSEPT™, available from Interface Research Corporation. The antimicrobials are added in effective amounts, e.g., amounts ranging from 0.1 to 5%, preferably 0.5 to 2%, based on fabric weight.

The resulting padded fabric can be dried and the fabric can be heatset in a tenter frame to provide a fabric which is stain resistant, cleanable, and resisant to microbial growth.

THERMOPLASTIC COMPONENT

The thermoplastic component is applied to the back of the fabric (the side which is not printed) in order to reduce or seal completely the openings between the fabric yarns thereby providing a barrier to liquid penetration. If opaque, the thermoplastic component can further act as a barrier to light penetration. A wide variety of thermoplastic components find utility in the present invention. Preferably, such thermoplastics are applied to the fabric as thermoplastic films. By way of example and not limitation, the following materials may be employed: polyesters, especially poly (ethylene terephthalate); polyamides, especially Nylon 6 and Nylon 6,6; polyolefins, especially polyethylene, polypropylene and random and block copolymers thereof; polyvinylchloride; polyvinylidene chloride; copolymers of vinyl chloride and vinylidene chloride; ethylene vinyl acetate; polyurethane; and elastomeric polyurethanes such as polyether/polyurethane and polyester/polyurethane films. In general, elastomeric polyurethanes are formed by the reaction of a hydroxyl-terminated polyester or polyether, a diisocyanate and a low molecular weight glycol as described more fully in Kirk-Othmer, Encyclopedia of Chemical Technology, Third Edition, Vol. 8, pages 632–635 (1979). Thermoplastic films ranging from 0.2 to 20 mils in thickness may be used, preferably film thicknesses ranging from 0.5 to 5.0 mils, more preferably from 0.75 to 2.5 mils.

While fabrics typically used to manufacture upholstery, e.g., automotive interiors, generally have desirable stretch characteristics, conventional backcoating of such materials tends to severely restrict stretch and make the composite rather stiff or rigid. Such composites are more difficult to conform to a shaped substrate and are generally less pleasing to the eye. The elastomeric polyurethane film s employed to manufacture the composites of the present invention, even after backcoating with plastic, result in products having quite desirable stretch characteristics, e.g., from about 1 percent to about 40 percent depending upon the stretch of the fabric employed. They are therefore easier to process into a final product, e.g., by injection of a foam, and are more aesthetic ally pleasing than conventional back-coated laminates.

The most preferred film material employed in connection with the present invention is a polyester-polyurefthane film. Examples of suitable polyester-polyurethane films are the aromatic polyester polyurethanes sold under the n am e Tuftane™by Lord Corporation, Erie, Pa., U.S.A., as well as the PS series, of Deerfield Urethanes of South Deerfield, Mass., e.g., PS-8010S polyester/polyurethane. Such films have been found to be particularly desirable because of flashability characteristics imparted to the composite, general overall toughness of the film, and excellent flex characteristics over a wide temperature range, e.g., even in cold weather. The film material employed, futhermore, results in composites having excellent drape and soft hand, even after backcoating. All of these characteristics are, of course, desirable in fabric composites used in upholstery or drapes. Significantly, however, the composites of the present invention, because of their improved stretch, hand and drape characteristics may be employed to manufacture more complexly shaped parts for furniture, automotive and other applications than was previously possible.

With regard to the thermoplastic film, it has been found that polyesterpolyurethanes are especially preferred because, for instance, other films which might be otherwise desirable such as polyether/polyurethane and polyethylene may not satisfy the flammability requirements demanded in institutional applications. The polyester/polyurethanes, furthermore, may be employed without the necessity of adding flame retardants either to the film or the fabric or both which is not desired from the standpoint of cost, and also because such materials tend to retard adhesion and are frequently undesirable from an environmental standpoint. Additional flame retardants may, of course, be used if desired.

In a specialized application, the thermoplastic component of the fabric composite contains an opacifier, such as carbon black, to absorb light thus providing a substantially opaque fabric composite. Although other suitable opacifiers including colored pigments or dyes may be used to provide special coloration effects, carbon black is generally the most effective and economical opacifier for light blockout applications. Where a dark opacifier is added, the film fabric composite may be treated for aesthetic purposes with a lighter opaque backcoating, e.g., titanium dioxide, etc., to provide a lighter back side, making the film composite appear more as a normal fabric. In another embodiment, the opacifier may be present in the fabric itself or to the backcoating of the composite. However, incorporating the opacifier in the thermoplastic component is especially preferred. The foregoing fabric composites incorporating opacifier are especially suited to use as blackout curtains, e.g., in hotel rooms, darkrooms, etc.

PLASTIC BACKCOATING

The plastic backcoating applied to the thermoplastic component provides a composite material which can be transfer printed as well as to seal any pinholes present in the thermoplastic component as applied. Moreover, in light blockout applications, an opaque material such as titanium oxide may be added to the backcoating in order to obscure the light absorbing coating in the thermoplastic component of the fabric composite. After compositing the fabric with the thermoplastic component, a liquid barrier enhancing plastic coating composition is added to the backside of the composite, i.e., on the backside of the liquid barrier enhancing thermoplastic. The coating composition has a higher melting point or glass transition temperature ($T_g$) than the thermoplastic component present within the interstices of the fabric. Moreover, the coating composition is capable of withstanding temperatures of at least 350° F., preferably at least 380° F., more preferably at least 420° F. The coating comprises an element selected from the group consisting of polyurethane, acrylic polymer, and styrene-butadiene rubber (SBR). Suitable polyurethanes include Witcobond™W-290H, available from Witco of Greenwich, Conn. Suitable acrylic polymers include Tanner 4301, available from Tanner Chemical Co. of Greenville, S.C., Rohplex™HA-8, Rohplex™HA- 12, available from Rohm and Haas, of Philadelphia, Pa., as well as copolymers such as acrylic copolymer, e.g., butyl acrylate, ethyl acrylate, or styrene acrylate copolymer.

The plastic coating composition may also include minor amounts of other additives such as thickeners, which may be used to obtain the desired consistency and coating properties. Preferred thickeners include polyacrylate and hydroxymethyl cellulose. Other additives such as opacifiers, natural gums, associative thickeners and surfactants may also be employed. In addition, UV stabilizers such as Tinuvin™, available from Ciba-Geigy may be added in effective amounts. The plastic coating is added in amounts to provide a fabric composite containing, after drying, from 0.1 to 2.5 ounces per square yard, preferably from 0.5 to 2.0 ounces per square yard of plastic coating composition. In some instances this can be achieved by applying the coating composition to the fabric composite, drying the coating, and repeating the applying and drying steps so as to provide at least one additional coating.

APPLICATIONS

The composites of the present invention are capable of being transfer printed on the front surface of their fabric component, owing in large part to the capability of the liquid barrier backcoating to withstand temperatures encountered during transfer printing, 350° to 440° F., preferably 395° to 425° F., without melting or becoming tacky.

The coated composites of the present invention also exhibit quite desirable aesthetic properties such as hand characteristics and stretchability, the latter of which, in particular, assists in molding and forming operations. The composites of the present invention can also exhibit enhanced noise barrier characteristics and are thus especially desirable in noise-reducing applications such as window draperies, automotive or aircraft upholstery, etc. The present composites may also be employed in light blockout applications, as earlier noted.

Because the present composites are relatively non-porous to air, as contrasted to conventional backcoated fabrics, they may advantageously be processed by means of vacuum forming as well as thermal forming operations and are thus suited for preparing products of unusual shapes such as are found in, e.g., automotive applications. The air permeability of the composites of the present invention can preferably vary from 0.15 to 10 cubic feet of air per minute measured at 250 pascals. At levels below 0.15 cubic feet per minute, the breathability of the composite is reduced to unacceptable levels for use in upholstery and bedding applications.

Referring to the FIGURE, the preferred method of forming the thermoplastic film and fabric composite is presented. Films of 1 mm, 1.5 mm and 2 mm were used. Film 2 and a selected fabric 1, which may be prior treated with fluorochemical and/or antimicrobial agents, are joined together at positive drive roller 9, which feeds the two sheets at a uniform rate through the process. Spreading roller 10 helps to remove wrinkles and creases from both the film and the fabric prior to tacking the film to the fabric by steam heated roller 11 and opposing roller 12. Roller 11 is hot enough to soften film 2 to a tacky state without melting it, e.g., a temperature of at least 250° F., preferably 300° F. depending upon the particular film selected. The fabric 1 is maintained with slight pressure in contact with film 2 for a predetermined period of time, say from 0.5 seconds to 2 seconds. By first tacking the film and fabric together, it has been found that shrinkage is reduced and better coverage and utilization of the film is realized. However, the foregoing step is not essential to the practice of the invention.

After being optionally tacked together, the film and fabric proceed to the nip point between oil-filled roller 13 heated to from 350° F. to 425° F. and solid rubber roller 14. The oil-filled roller 13 is a chrome, Teflon® coated roller having hot oil circulated within. The oil is maintained at a temperature sufficient to heat film 2 and render it into a plastic state as it passes through nip point 15. It is believed that having a slight resiliency in rubber roller 14 helps prevent crushing the fabric during the lamination step.

The distance between roller 13 and 14 can be adjusted in the practice of the invention. Oil filled roller 13 is held stationary by support 16. Solid rubber roller 14 may travel vertically and is urged upwards by piston 17. The upward travel of solid rubber roller 14 can be limited by a set screw which can be adjusted to provide the desired distance or gap between the rollers. Piston 17 is capable of exerting sufficient upward force to provide pressures of up to 1,000 pounds per linear inch at the nip point 15 between the rollers.

The distance between rollers 13 and 14 is selected not only to provide a composite, but to force the film, while in a plastic state, into the interstices of the fabric. This results in a significant improvement in the performance of the fabric with regard to resistance to abrasion, pilling and seam slippage. The distance is less than the combined thickness of the film and 0.50 times the thickness of the fabric. Preferably, the distance between the rollers is less than the combined thickness of the film and 0.35 times the thickness of the fabric, most preferably less than the combined thickness of the film and between 0.30 and 0.10 times the thickness of the fabric. The film is forced into the fabric such that the thermoplastic film fills at least 50%, preferably at least 90% of the initial interstitial volume as determined by comparing the differences in the interstitial areas in micrographs of the fabric/composite before and after incorporation of the thermoplastic film. For present purposes, it is assumed that the interstitial area is directly proportional to interstitial volume. Specifically, micrographs taken at 41× magnification using an Olympus BX-MAX microscope with reflected, polarized light were compared.

Surprisingly, the pressure exerted to force the film while in a plastic state into the fabric does not result in permanent distortion to the face of the fabric. Even pile fabric, especially velours, may be used in the process. Upon cooling, some contraction of the fabric thickness is observed which evidences the significant penetration of the film into the fabric. Thus, after the fabric/film composite is formed, decreases in the thickness of the composite from 20% to 40% may be seen, with decreases of 25% to 35% being more typical. The temperature of the heated oil in the roller 13 is dependent upon such factors as the melting temperature of the thermoplastic film and the feed rate of the fabric and film through rollers 13 and 14. For example, temperatures of between 350° F. and 425° F. using polyester/polyurethane film having a thickness of 1 mil at a feed rate of 5 to 15 linear feet per minute have been found to be sufficient. The heated oil can be circulated through roller 13 via a supply line and return line (not shown).

After passing between rollers 13 and 14 the fabric/film composite is cooled by water cooled rollers 21. (Optionally, the cooled composite may be taken up at this point and shipped for coating at a remote location.) Roller 21*a* then conveys the laminate to a coating bath 21*b* where one side (the back side) is coated with a coating compostion and thereafter excess amounts are trimmed with a knife 21*c* to a thickness sufficient to provide a continuous surface free of pinholes as well as to provide a fabric composite containing, after drying, from 0.1 to 2.5 ounces per square yard, preferably from 0.5 to 2.0 ounces per square yard of plastic coating composition. The coated film composite is thence passed to a drier 22*a* and from there to accumulator 23 where it is taken up by take up roll 24.

At this point the composite may be stored for future use or it may be further processed immediately by, for instance, transfer printing or cutting into desired shapes for the particular application desired.

The invention may be further understood by reference to the following examples which are not to be construed as limiting the invention as defined in the claims appended hereto.

EXAMPLE 1

Comparative—Padded fabric with 1 mil polyester/polyurethane film

Step 1: A flat woven, oxford weave, filament polyester fabric with a 300d warp and a 3 ply 150 fill, weighing 10.75 ounces per linear yard at 57.5", is treated (padded) at 50% pick up on weight of fabric. The mix contains:

A. 6.6% Fluorochemical (Milliguard® BK 96)
B. 3.0% Bacteriostat (Ultrafresh® NM)
C. 1.75% Fungicide (Ultrafresh® 40)
D. 88.65% Water After padding, the fabric is run down a tenter frame at 350° F. at 30 yards/minute for approximately 2.5 minutes.

Step 2: A 1 mil film of PS-8010S polyester/polyurethane from Deerfield Urethanes is applied to the padded fabric in accordance with the above-described process. The steam roller is maintained at 325° F. and the oil roller is maintained at 390° F. The line speed is 3 yards/minute and the desire pressure is 1000 psi.

EXAMPLE 2

Comparative—Padded fabric with 2 mil polyester/polyurethane film

Example 1 was repeated except that a 2 mil film of PS-8010S polyester/urethane was used.

EXAMPLE 3

Comparative—Padded fabric with single acrylic backcoat

A flat woven, oxford weave, filament polyester fabric with a 300d warp and a 3 ply 150 fill, weighing 10.75 ounces per linear yard at 57.5", is treated (padded) at 50% pick up on weight of fabric. The mix contains:

A. 6.6% Fluorochemical (Milliguard® BK 96)
B. 3.0 % Bacteriostat (Ultrafresh® NM)
C. 1.75 % Fungicide (Ultrafresh® 40)
D. 88.65% Water After padding, a single coat of acrylic latex (Tanner 4301) was applied with a knife coater @ 1.2 ounces per square yard and dried on a tenter frame at 300° F. @20 yards/minute.

EXAMPLE 4

Comparative—Padded fabric with double acrylic backcoat

Example 3 was repeated except that a double coat of acrylic was applied.

EXAMPLE 5

Padded fabric with 1 mil polyester/polyurethane film and single acrylic backcoat Example 1 was repeated in its entirety. A single coat of acrylic latex (Tanner 4301) was applied with a knife coater @ 1.2 ounces per square yard and dried on a tenter frame at 300° F. @ 20 yards/minute.

The products of the foregoing examples were tested for hydrostatic head Hydrostatic Pressure Test (AATCC Test Method 127-1980), air permeability (ASTM D737), water repellency, Spray Test (AATC Test Method 22-1980) and transfer printability (empiric observation), the results of which are provided in the Table below.

TABLE

| EXAMPLE | Hydrostatic Head | Air Permeability ft³/min @ 125 Pa | Spray Test Rating | Transfer Printability |
|---|---|---|---|---|
| 1 | 16 | 1.43 | 100 | No |
| 2 | 40 | 0 | 100 | No |
| 3 | 23 | — | 100 | Yes |
| 4 | 100 | — | 100 | Yes |
| 5 | >120 | — | 100 | Yes |

There are, of course, many alternate embodiments and modifications which are intended to be included within the scope of the following claims.

What is claimed is:

1. A barrier fabric composite comprising:
   i) a textile fabric comprising a front surface, a back surface, interstices within said fabric, and a measurable interstitial volume;
   ii) a thermoplastic within said interstices and on said back surface, said thermoplastic filling at least 50% of said interstitial volume. wherein said thermoplastic is selected from the group consisting of polvester, polvamide, polyolefin, polyvinyl chloride, polvinylidene chloride, copolymers of vinyl chloride and vinylidene chloride. ethylene vinyl acetate. polyurethane. polyester/polyurethane and polyether urethane; and
   iii) a plastic coating, on the back surface of said thermoplastic, having a higher melting point or glass transition temperature ($T_g$)than said thermoplastic, and capable of withstanding temperatures of at least 350° F.;
   wherein components ii) and iii) both provide liquid resistance to the barrier fabric; and
   wherein component iii) is selected from an acrylic polymer, poly(vinylchloride), and styrene-butadiene rubber.

2. The barrier fabric composite of claim 1 wherein
   i) said textile fabric is selected from the group consisting of polyester, polyolefin, and nylon;
   ii) said thermoplastic fills at least 90% of the interstitial volume and is selected from the group consisting of polyester, polyamide, polyolefin, polyvinyl chloride, polyvinylidene chloride, copolymers of vinyl chloride and vinylidene chloride, ethylene vinyl acetate, polyurethane, polyester/polyurethane and polyether urethane; and
   iii) said plastic coating comprises an element selected from the group consisting of acrylic polymer, poly (vinylchloride), and styrene-butadiene rubber (SBR) and said coating is capable of withstanding temperatures of at least 380° F.

3. The barrier fabric composite of claim 1 wherein
   i) said textile comprises polyester;
   ii) said thermoplastic comprises an element selected from the group consisting of polyurethane, polyester/ polyurethane and polyether/polyurethane; and
   iii) said plastic coating comprises a copolymer selected from the group consisting of butyl acrylate, ethyl acrylate, and styrene acrylate, said coating capable of withstanding temperatures of at least 420° F.

4. The barrier fabric composite of claim 1 wherein said front surface of said fabric contains a fluorochemical agent.

5. The barrier fabric composite of claim 1 wherein said front surface of said fabric contains an antimicrobial agent.

6. The barrier fabric composite of claim 1 wherein said thermoplastic contains an opacifier in amounts sufficient to provide light barrier properties to said composite.

7. The barrier fabric composite of claim 1 wherein said textile fabric weighs from 3 to 24 ounces per square yard and said composite has a thickness ranging from 20 to 100 mils and can withstand a hydrostatic pressure test of at least 120 cm.

8. The barrier fabric composite of claim 1 wherein said front surface of said textile fabric is transfer printed and said plastic coating is capable of withstanding temperatures encountered during transfer printing without melting or becoming tacky.

* * * * *